Nov. 17, 1925.
R. H. GARMAN
1,562,225
INSTRUCTION OUTFIT FOR CHILDREN
Filed Jan. 2, 1925
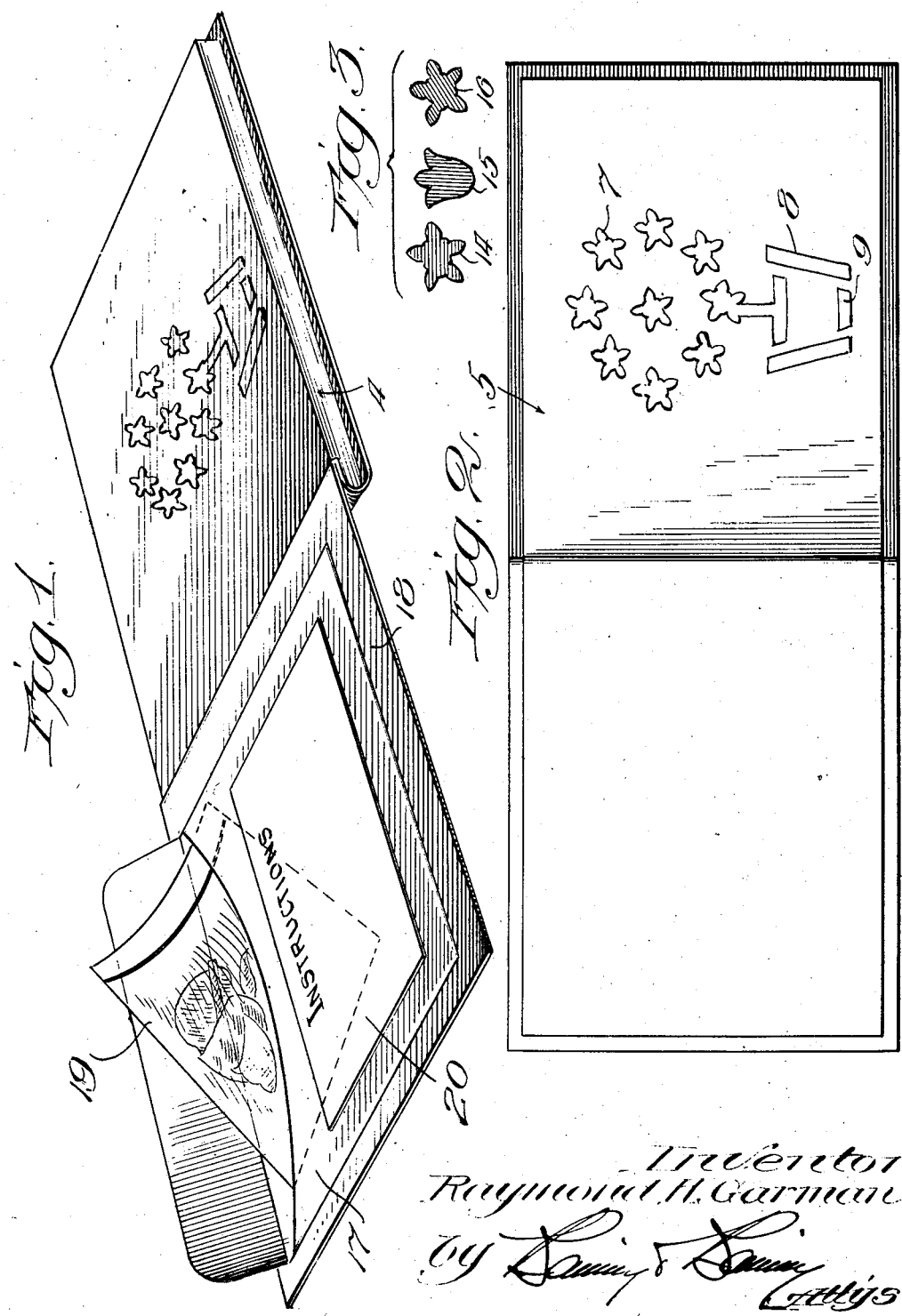
Inventor
Raymond H. Garman Patented Nov. 17, 1925.

1,562,225

UNITED STATES PATENT OFFICE.

RAYMOND H. GARMAN, OF WILMETTE, ILLINOIS.

INSTRUCTION OUTFIT FOR CHILDREN.

Application filed January 2, 1925. Serial No. 213.

*To all whom it may concern:*

Be it known that I, RAYMOND H. GARMAN, a citizen of the United States, residing at Wilmette, in the county of Cook and State of Illinois, have invented certain new and useful Improvements in Instruction Outfits for Children, of which the following is a specification.

This invention has to do with improvements in outfits for the instruction and training of little children. At the same time it has to do with an outfit which will afford the child much pleasure and recreation in its use as well as giving instruction and training in the use of its various faculties.

The main object of the invention is to provide an outfit which is so arranged that the child can produce colored pictures and designs of different kinds without having to use paints or colored crayons or other similar equipment, of a nature which is mussy and undesirable for the use of children from other standpoints.

A further object of the invention is to provide an outfit of such nature and arrangement that the child will be trained in an elementary manner in the use of its faculties of co-ordination and association. For this purpose, one of the objects of the invention is to provide an outfit having parts of co-ordinated shape and design, so that the child must needs bring them into proper relationship in order to complete the design.

Another object of the invention is to provide an arrangement whereby when the different parts are properly related, complete designs of striking appearance and color will be produced, or designs closely imitating and representing such objects as flower pots with growing plants, etc.

Briefly stated, my invention consists in the provision of one or more sheets having marked thereon the outlines of simple objects which are to be colored, or the outlines of material and disconnected portions of such objects, together with a series of sections of paper or the like cut to fit the beforementioned outlines, such cut out parts each being colored with a single block of color according to the colors of the designs which they are to fill, and being preferably gummed on their reverse sides, so that they are readily applicable in permanent fashion to their respective locations on the sheet of designs.

It is further intended to associate such cut out portions directly with the sheet to which they refer by providing a suitable envelope or other receptacle within which they are retained prior to actual use.

Other objects and uses of the invention will appear from a detailed description of the same, which consists in the features of construction and combinations of parts hereinafter described and claimed.

In the drawings:

Figure 1 shows a perspective view of an opened book embodying the features of the present invention, and having on its exposed page a simple series of outlines to which the cut out and block colored parts may be applied, and having on the inside face of the book cover a pocket or envelope for the reception of the cut out sections which are illustrated as being contained within a transparent slip partially set into the envelope;

Fig. 2 shows a face view of a pair of pages of the book of Fig. 1; and

Fig. 3 shows two cut out parts of different colors for application to three of the spaces illustrated in Fig. 2.

For purpose of convenience, I have illustrated the invention as including a sheet constituting one or more pages of a book, but it will be understood that as far as the features of the invention are concerned, the sheet might take the form of an independent sheet of paper or cardboard or other material having the outlined design thereon, and to which the cut out sections are supposed to be applied.

The book illustrated includes a number of pages 4. In Fig. 2, one of these pages 5 is illustrated. On these pages there are formed various outlines such, for example, as stars 7, large bars 8, short bars 9, as well as others which do not require specification.

Corresponding to the different outlines I provide cut out paper or similar members 14, 16, etc., corresponding to the different outlines which are to be treated. These cut out sections are of the same size and shape as the outlines to which they are to be applied. For example, the stars 14 and 16 are intended to be applied to two of the star spaces indicated in Fig. 2, (it being understood that the cut out sections in Fig. 3 are on somewhat larger scale than the outlines illustrated in Fig. 2).

Each of these sections is distinctively colored with a single block color as represented by the different directions of the shading on the different parts illustrated in Fig. 3. For example, the stars 14 and 16 may be respectively blue and red. Many other cut out parts may be provided corresponding to the needs of the outfit.

I also prefer to provide an envelope 17 on the book cover 18, so that the various cut out sections 14, 16 may be placed in a slip 19 which is then slipped into the envelope 17 so as to make it readily available and prevent separation of the different parts of the outfit. If desired, certain instructions 20 may be placed on the face of the envelope 17.

While I have herein shown and described only certain embodiments of the features of my present invention, still I do not intend to limit myself to the same, except as I may do so in the claim.

I claim:

In a child's instructive outfit for the purpose specified, a sheet or leaf having thereon individual disconnected outlines to be colored, said outlines being each self-contained and disconnected from other outlines, together with a series of die-cut paper sections each of proper size and shape to fit into and completely occupy one of the aforesaid outlines, each of the aforesaid die-cut sections being colored on its top surface with a solid block of a single color and gummed on its lower surface for direct attachment to the sheet within the intended outline, whereby said die-cut paper sections when so attached serve to completely occupy and completely color the outlines within which they are placed and produce an attractive ornamental design or pattern of disconnected units of solid color blocks, substantially as and for the purpose set forth.

RAYMOND H. GARMAN.